(12) United States Patent
Park

(10) Patent No.: US 7,464,682 B2
(45) Date of Patent: Dec. 16, 2008

(54) VARIABLE INTAKE SYSTEM FOR VEHICLE

(75) Inventor: Dae Sung Park, Suwon (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 11/648,725

(22) Filed: Dec. 29, 2006

(65) Prior Publication Data

US 2008/0017155 A1    Jan. 24, 2008

(30) Foreign Application Priority Data

Jul. 24, 2006    (KR) .................... 10-2006-0069021

(51) Int. Cl.
*F02M 35/108* (2006.01)
(52) U.S. Cl. ................................. 123/184.55
(58) Field of Classification Search ............ 123/184.21, 123/184.53, 184.55
See application file for complete search history.

(56) References Cited

U.S. PATENT DOCUMENTS

| | | | |
|---|---|---|---|
| 6,668,782 B2 * | 12/2003 | Bochum et al. ........ | 123/184.55 |
| 7,011,064 B2 | 3/2006 | Kito et al. | |
| 2004/0261745 A1 * | 12/2004 | Kito et al. .............. | 123/184.42 |
| 2005/0279312 A1 * | 12/2005 | Park ...................... | 123/184.53 |
| 2006/0005798 A1 * | 1/2006 | Chu ....................... | 123/184.55 |

FOREIGN PATENT DOCUMENTS

JP    09-133056    5/1997

* cited by examiner

*Primary Examiner*—Stephen K Cronin
*Assistant Examiner*—Ka Chun Leung
(74) *Attorney, Agent, or Firm*—Morgan, Lewis & Bockius LLP

(57) ABSTRACT

A variable intake system includes an intake manifold having at least one runner, an opening/closing unit for adjusting a length of the runner, an actuator for activating the opening/closing unit, and a vacuum unit defining a vacuum chamber for driving the actuator. The vacuum unit is disposed inside the intake manifold.

14 Claims, 3 Drawing Sheets

VARIABLE INTAKE SYSTEM FOR VEHICLE

CROSS-REFERENCE TO RELATED APPLICATION

This application claims priority to and the benefit of Korean Patent Application No. 10-2006-0069021 filed in the Korean Intellectual Property Office on Jul. 24, 2006, the entire contents of which are incorporated herein by reference.

BACKGROUND OF THE INVENTION (a) Field of the Invention

The present invention relates to a variable intake system for a vehicle, and more particularly, to a variable intake system with a vacuum chamber inside an intake manifold.

(b) Description of the Related Art

A variable intake system adjusts the runner length of an intake manifold. The variable intake system includes a throttle body, a surge tank communicating with the throttle body, an intake manifold having a plurality of runners to which air is dispensed from the surge tank, an opening/closing unit for adjusting the runner length, an actuator that activates the opening/closing unit, and a vacuum chamber for driving the actuator.

Vacuum chambers have been developed as an independent engine component. The vacuum chamber can be designed without shape or size limitations to have sufficient volume. Furthermore, the mounting position of the vacuum chamber can be freely selected.

The mounting position of the vacuum chamber is determined by the layout of the engine and vehicle. The vacuum chamber must be sufficient in size and the connection tube that connects the vacuum chamber must be simple in design.

Further, an effort to manufacture the variable intake system using plastic has continued to reduce the weight of the engine. However, the vacuum chamber requires many components such as a mounting bracket, a bracket coupling member, an actuator, and a vacuum hose connecting the actuator to the vacuum chamber. Therefore, the manufacturing cost increases and the space taken by the vacuum chamber increases.

Also, experiments show that noise increases when the variable intake system is formed of plastic. Particularly, this noise is primarily generated by the increase of a flow ratio when air passes through the throttle body, and is secondarily generated when the air passes through the runners of the intake manifold.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention provides a variable intake system with relatively few components and a simple structure that takes up relatively less space. The present invention also minimizes weight, provides a vacuum chamber having a relatively large volume, and reduces noise.

An exemplary embodiment of the resent invention provides a variable intake system including an intake manifold having at least one runner, an opening/closing unit for adjusting a length of the runner, an actuator for activating the opening/closing unit, and a vacuum unit defining a vacuum chamber for driving the actuator, wherein the vacuum unit is disposed inside the intake manifold.

The vacuum unit may include an upper body and a lower body. The upper and lower bodies may be coupled to each other by vibration welding. An upper portion of the vacuum unit may include a curved surface inclined toward an inlet of the intake manifold. The opening/closing unit may be provided on an upper portion of the runner.

DETAILED DESCRIPTION OF THE PREFERRED EMBODIMENTS

Figure 1:
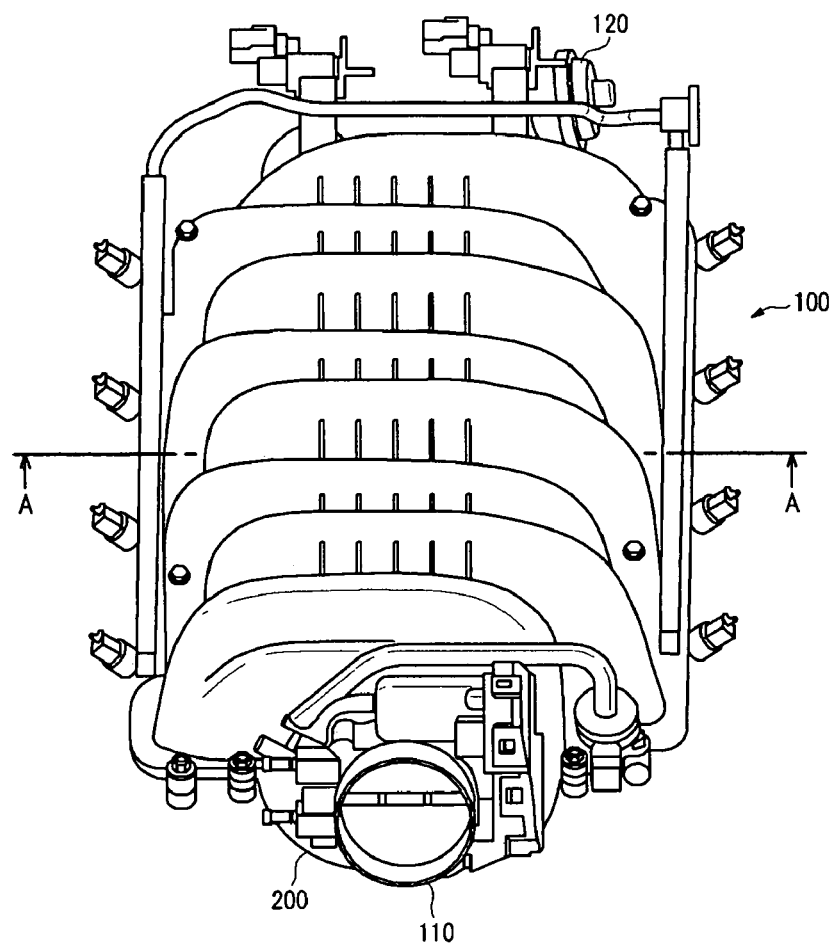
FIG. 1 is a perspective view of a variable intake system for a vehicle according to an exemplary embodiment of the present invention.

An exemplary embodiment of the present invention will hereinafter be described in detail with reference to the accompanying drawings.

A throttle valve 110 through which external air is introduced and an actuator 120 for operating an opening/closing unit 530 using a negative pressure from the vacuum chamber 550 are connected to a variable intake system 100 for a vehicle.

A lower body 200 is placed at a lower portion of the variable intake system 100.

Figure 2:
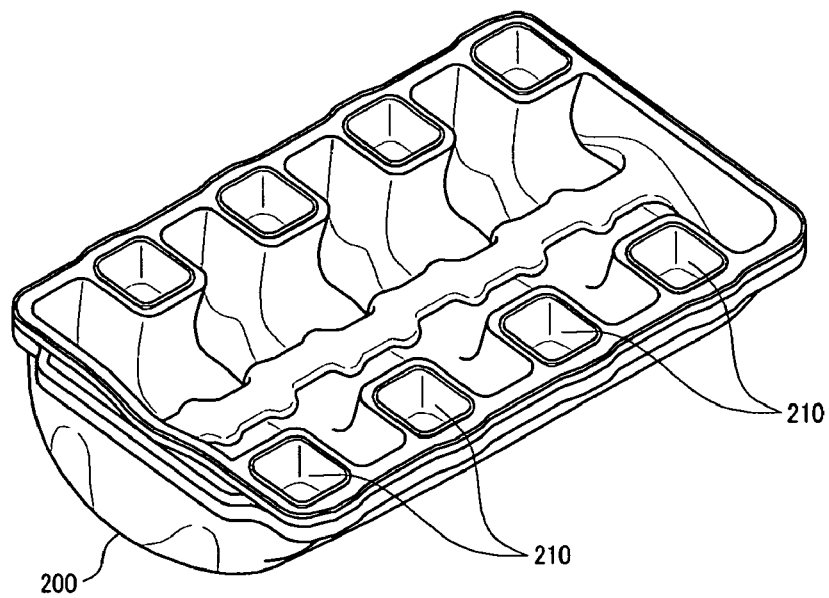
FIG. 2 is a partial perspective view of a lower body of a variable intake system according to an exemplary embodiment of the present invention.
Figure 3:
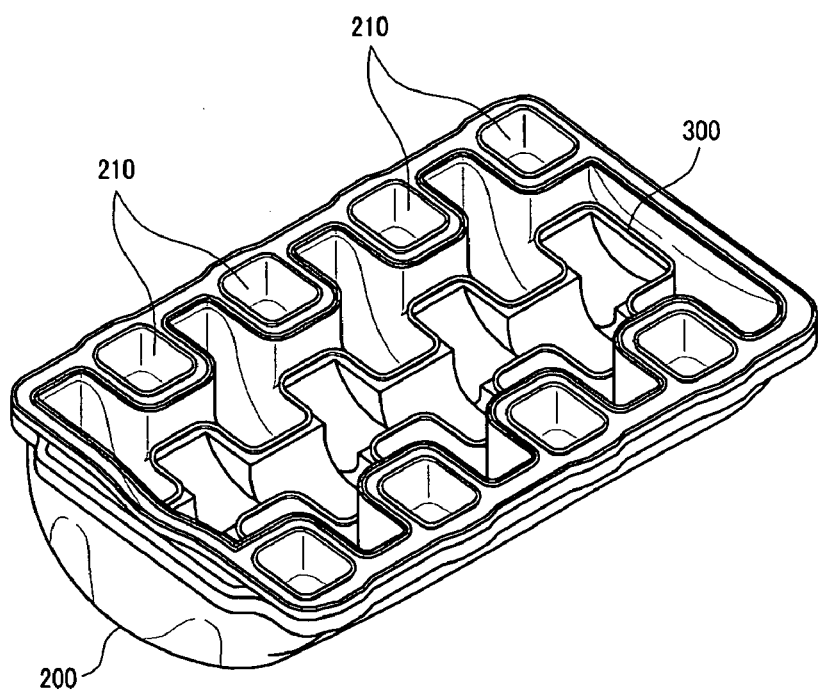
FIG. 3 is a view illustrating an example where a vacuum chamber lower body is coupled to the lower body of the variable intake system of FIG. 2.
Figure 4:
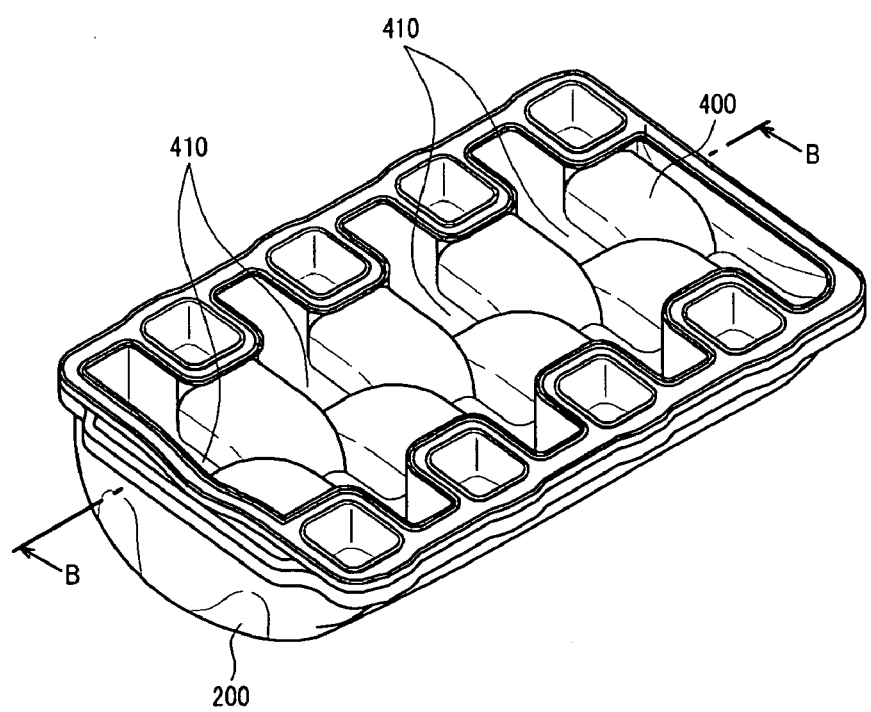
FIG. 4 is a view illustrating an example where a vacuum chamber upper body is coupled to the vacuum chamber lower body of FIG. 3.

Referring to FIG. 2, a runner 210 of an intake manifold is formed in the variable intake system 100.

Figure 5:
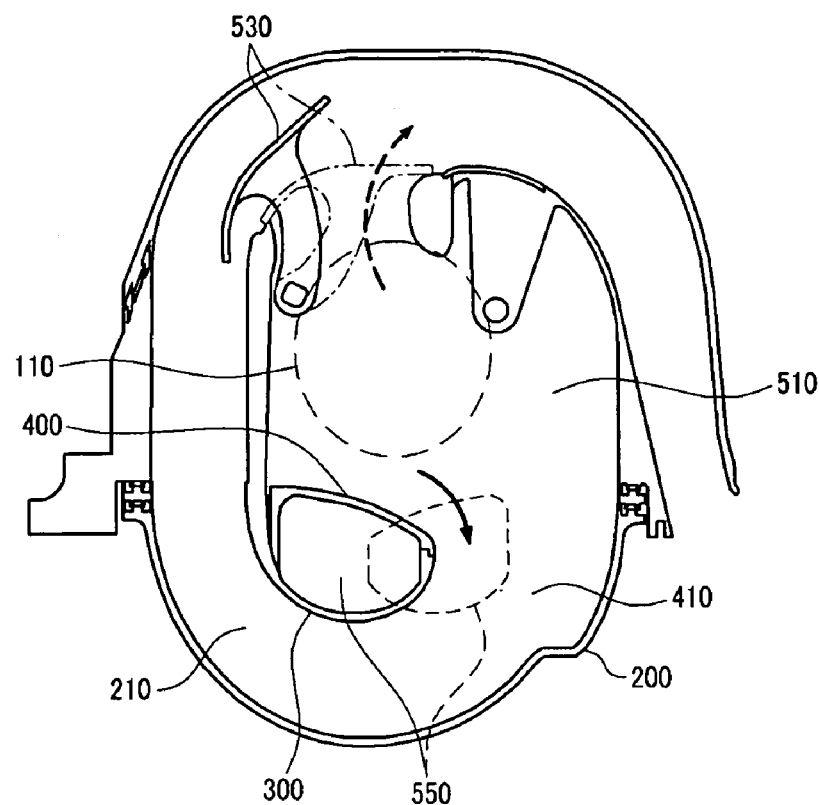
FIG. 5 is a sectional view taken along line A-A of FIG. 1.
Figure 6:
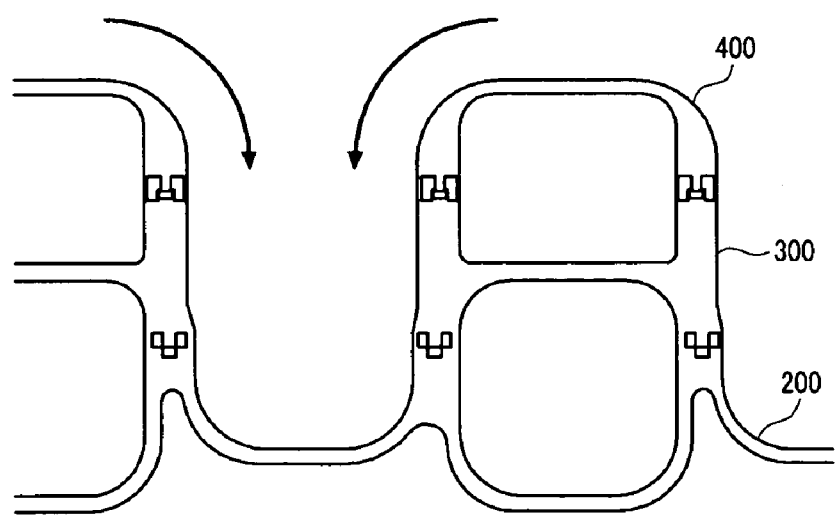
FIG. 6 is a sectional view taken along line B-B of FIG. 4.

As shown in FIG. 5, the upper portion of the vacuum chamber 550 is inclined toward a runner inlet 410 and provided with a curved surface. Therefore, when the air is directed toward the runner inlet 410, the airflow resistance is minimized.

For convenience, only one of the runners of the intake manifold will be described with reference to the accompanying drawing.

Referring to FIG. 5, the vacuum chamber upper body 400 is provided with a curved surface, being inclined toward the runner inlet 410.

As shown in FIG. 5, the opening/closing unit 530 for controlling the airflow is provided on an upper portion of the runner 210.

In FIG. 5, the throttle valve 110 is illustrated using a dotted line.

The air directed into the surge tank 510 through the throttle valve 110 is further directed into the runner 210.

The opening/closing unit 530 opens and closes according to the operation of the engine. When the opening/closing unit 530 is closed, the length of the runner 210 through which the air passes increases. When the opening/closing unit 530 is opened, the length of the runner 210 through-which the air passes is reduced.

When the vehicle runs at high speed, the opening/closing unit 530 is opened. When the vehicle runs at low speed, the opening/closing unit 530 is closed.

FIG. 5 shows an example when the opening/closing unit 530 is open. The one-point chain line shows when unit 530 is closed.

When the opening/closing unit 530 is open, air flows from the surge tank 510 into the runner 210 following the dotted arrow.

The opening/closing unit 530 is controlled by the actuator 120, which is driven by the negative pressure in the vacuum chamber 550, generated by the surge tank 510.

The actuator 120 is controlled by an electronic control unit (ECU) (not shown).

As shown in FIG. 5, the upper portion of the vacuum chamber 550 functions as a bell mouth that can minimize the airflow resistance when the air flows into the runner 210.

By the bell mouth having a relatively large radius, the chance of vortex generation is low. Also, the airflow resistance is low.

In FIG. 5, air from the surge tank 510 flows into the runner 210 through the runner inlet 410 in the direction of the solid arrow. The arrow in FIG. 5 is curved gently. This means that the airflow resistance is further reduced.

Since the variable intake system of the present invention has the vacuum chamber 550 placed inside, the structural rigidity is enhanced. The intake manifold or the barrier rib can be thin and thus weight of the overall system can be reduced.

Further, the volume of the vacuum chamber 550 can be enlarged without increasing the weight.

The noise is reduced by an air gap effect.

That is, since the vacuum chamber 550 has a different air density inside of the variable intake system, noise is reduced. Experiments show that noise is reduced throughout the entire region of the variable intake system.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A variable intake system for a vehicle, comprising:
    an intake manifold comprising at least one runner;
    at least one opening/closing unit for adjusting a length of the runner, the opening/closing unit comprising a pivot at a first side thereof, such that when the opening/closing unit is open, a fluid passageway is defined at a second side thereof, wherein the opening/closing unit defines a curved surface, the curved surface defining a smooth, uninterrupted curve of the runner when the opening/closing unit is closed;
    at least one actuator for activating the opening/closing unit; and
    at least one vacuum unit defining a vacuum chamber for driving the actuator, and disposed inside the intake manifold.

2. The variable intake system of claim 1, wherein the vacuum unit comprises a vacuum chamber upper body and a vacuum chamber lower body.

3. The variable intake system of claim 2, wherein the vacuum chamber upper body and the vacuum chamber lower body are coupled to each other by vibration welding.

4. The variable intake system of claim 1, wherein an upper portion of the vacuum unit comprises a curved surface inclined toward an inlet of the intake manifold.

5. The variable intake system of claim 4, wherein an inlet portion of the runner comprises a shape of a bell mouth, wherein the bell mouth is defined at least in part by the vacuum unit.

6. The variable intake system of claim 1, wherein the opening/closing unit is disposed at an upper portion of the runner.

7. A variable intake system for a vehicle, comprising:
    an intake manifold comprising first and second runners;
    first and second opening/closing units for adjusting lengths of the first and second runners, respectively;
    first and second actuators for activating the first and second opening/closing units, respectively; and
    first and second vacuum units, each defining a vacuum chamber for driving the first and second actuators, respectively, and disposed inside the intake manifold, wherein the first vacuum unit is disposed at a first side of the intake manifold, and the second vacuum unit is disposed at a second side of the intake manifold, wherein an upper portion of each vacuum unit comprises a curved surface inclined toward an inlet of the intake manifold;
    wherein an inlet portion of each runner comprises a shape of a bell mouth, wherein the bell mouth is defined at least in part by one of the vacuum units.

8. The variable intake system of claim 7, wherein each vacuum unit comprises a vacuum chamber upper body and a vacuum chamber lower body.

9. The variable intake system of claim 8, wherein the vacuum chamber upper body and the vacuum chamber lower body are coupled to each other by vibration welding.

10. The variable intake system of claim 7, wherein each opening/closing unit is disposed at an upper portion of the runner.

11. A variable intake system for a vehicle, comprising:
    an intake manifold comprising at least one runner;
    at least one opening/closing unit for adjusting a length of the runner;
    at least one actuator for activating the opening/closing unit; and
    at least one vacuum unit defining a vacuum chamber for driving the actuator, and disposed inside the intake manifold;
    wherein an upper portion of the vacuum unit comprises a curved surface inclined toward an inlet of the intake manifold, wherein an inlet portion of the runner comprises a shape of a bell mouth, wherein the bell mouth is defined at least in part by the vacuum unit.

12. The variable intake system of claim 11, wherein the vacuum unit comprises a vacuum chamber upper body and a vacuum chamber lower body.

13. The variable intake system of claim 12, wherein the vacuum chamber upper body and the vacuum chamber lower body are coupled to each other by vibration welding.

14. The variable intake system of claim 11, wherein the opening/closing unit is disposed at an upper portion of the runner.

* * * * *